United States Patent
Compton et al.

(10) Patent No.: US 11,816,964 B2
(45) Date of Patent: Nov. 14, 2023

(54) CELLULOSE ESTER COMPOSITIONS FOR CALENDERING

(71) Applicant: Eastman Chemical Company, Kingsport, TN (US)

(72) Inventors: David Wayne Compton, Church Hill, TN (US); Michael Eugene Donelson, Kingsport, TN (US); James Collins Maine, Church Hill, TN (US); Marcus David Shelby, Fall Branch, TN (US); Freddie Wayne Williams, Kingsport, TN (US); Robert Erik Young, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 1198 days.

(21) Appl. No.: 16/319,366

(22) PCT Filed: Jul. 19, 2017

(86) PCT No.: PCT/US2017/042740
§ 371 (c)(1),
(2) Date: Jan. 21, 2019

(87) PCT Pub. No.: WO2018/017652
PCT Pub. Date: Jan. 25, 2018

(65) Prior Publication Data
US 2019/0256674 A1     Aug. 22, 2019

Related U.S. Application Data

(60) Provisional application No. 62/365,426, filed on Jul. 22, 2016.

(51) Int. Cl.
*G07F 17/34* (2006.01)
*B29C 43/24* (2006.01)
(Continued)

(52) U.S. Cl.
CPC .............. *G07F 17/34* (2013.01); *B29C 43/24* (2013.01); *C08J 5/18* (2013.01); *C08K 5/0016* (2013.01);
(Continued)

(58) Field of Classification Search
CPC ........................................................ C08L 1/12
See application file for complete search history.

(56) References Cited

U.S. PATENT DOCUMENTS

| | | |
|---|---|---|
| 6,068,910 A | 5/2000 | Flynn et al. |
| 6,551,688 B2 | 4/2003 | Moskala et al. |

(Continued)

FOREIGN PATENT DOCUMENTS

| | | |
|---|---|---|
| EP | 1024217 A2 | 8/2000 |
| GB | 2489491 A | 10/2012 |

(Continued)

OTHER PUBLICATIONS

ASTM D6400; "Standard Specification for Labeling of Plastics Designed to be Aerobically Composted in Municipal or Industrial Facilities"; May 15, 2012.
(Continued)

*Primary Examiner* — Arrie L Reuther
(74) *Attorney, Agent, or Firm* — Kenrick L. Vidale

(57) ABSTRACT

This invention relates to cellulose ester compositions cable of being calendered. The invention also relates to calendered films or sheets comprising the cellulose ester compositions and processes for calendering the cellulose compositions.

6 Claims, 5 Drawing Sheets

(51) Int. Cl.
  *C08J 5/18* (2006.01)
  *C08K 5/00* (2006.01)
  *C08L 1/12* (2006.01)
  *C08L 1/14* (2006.01)
  *G07F 17/32* (2006.01)
  *B29K 1/00* (2006.01)

(52) U.S. Cl.
  CPC ............... *C08L 1/12* (2013.01); *C08L 1/14* (2013.01); *G07F 17/3209* (2013.01); *G07F 17/3213* (2013.01); *G07F 17/3267* (2013.01); *B29K 2001/12* (2013.01); *C08J 2301/12* (2013.01); *C08J 2301/14* (2013.01)

(56) References Cited

U.S. PATENT DOCUMENTS

| | | | |
|---|---|---|---|
| 6,565,787 | B1 | 5/2003 | Sarver et al. |
| 2008/0015297 | A1 * | 1/2008 | Flynn ............... C08K 5/0008 524/400 |

FOREIGN PATENT DOCUMENTS

| | | | |
|---|---|---|---|
| WO | 2009/029217 | * | 3/2009 |
| WO | WO 2010055777 A1 | | 5/2010 |
| WO | WO 2014169409 A1 | | 10/2014 |
| WO | WO 2015/098491 A1 | | 7/2015 |

OTHER PUBLICATIONS

ASTM D3418-15; "Standard Test Method for Transition Temperatures and Enthalpies of Fusion and Crystallization of Polymers by Differential Scanning Calorimetry"; May 1, 2015.

ASTM D3835-16; "Standard Test Method for Determination of Properties of Polymeric Materials by Means of a Capillary Rheometer"; May 1, 2016.

"Licowax, Licolub and Licocene for PVC Processing"; Oct. 2010; URL:http://siliconasyquimicos.com/index.php/component/k2/item/download/442_d6d526dde0709570d9fc4176752d3410.

Balser, Klaus, et al.; "Cellulose Esters"; Ullmann's Encyclopedia of Industrial Chemistry, vol. 7, pp. 333-380, 2012.

Zepnik, Stefan, et al.; "Cellulose Acetate for Thermoplastic Foam Extrusion" In: "Cellulose—Biomass Conversion"; InTech, Aug. 29, 2013. pp. 17-44.

"Paraloid™ K-125 Processing Aid for Vinyl"; Mar. 1, 2002, URL:http://www.dow.com/assets/attachments/buinsess/plastics_additives/paraloid_k/paraloid_k-125/tds/paraloidk-125.pdf.

Hanselmann, Ralf; "Glasubergangstemperatur"; Rompp online 4.0, Dokumentenkennung RD-07-01216, Jul. 1, 2007; URL:https://roempp.thieme.de/roempp4.0/do/data/RD-07-01216—machine translation.

* cited by examiner

CELLULOSE ESTER COMPOSITIONS FOR CALENDERING

BACKGROUND OF THE INVENTION

Production of film and sheet with cellulose esters has historically been limited to standard extrusion and solvent casting methods. Most of the film extrusion lines use single screw extruders which can normally only handle pelletized or large granulated material. Because cellulose esters are typically produced in a powder form—and because most typically need plasticizer modification to be able to flow properly—they go through an extra separate compounding step in order to be converted into a melt extrudable form. This extra compounding requires higher temperatures, adds cost, and increases variability and degradation, including plasticizer loss, of the final film product. In contrast, typical mixing and blending equipment used in calendering operations can handle powders, and incorporate the compounding step into the main process. Furthermore, by reducing the number of processing steps and running at a lower temperature, better quality and lower cost film can be produced by calendering.

Although calendering offers some very attractive features, both from a performance and financial perspective, very few materials besides PVC, have the right combination of processing window, flow characteristics and metal release to be able to be produced effectively by this method. Applicants have discovered cellulose ester compositions that are capable of being calendered using conventional calendering processes to produce uniform films and sheets.

BRIEF SUMMARY OF THE INVENTION

The present application discloses a composition for calendering comprising:
(a) a cellulose ester comprising
  (i) a plurality of $(C_{2-5})$alkanoyl substituents; and
  (ii) a plurality of hydroxyl substituents,
  wherein the degree of substitution of the hydroxyl substituent ("$DS_{OH}$") is in the range of from about 0.3 to about 1.0;
(b) a plasticizer;
(c) a roll release agent; and
(d) a processing aid
wherein the plasticizer is present in the composition in the range of from 0 wt % to about 40.0 wt % based on the total weight of the composition,
wherein the roll release agent is present in the composition in the range of from about 0.1 wt % to about 2.0 wt % based on the total weight of the composition,
wherein the processing aid is present in the composition in the range of from about 0 wt % to about 6.0 wt % based on the total weight of the composition,
wherein the cellulose ester has a glass transition temperature from about 80° C. to about 200° C.,
wherein the percent crystallinity of the cellulose ester obtained from the second heat cycle is less than about 20%, wherein the percent crystallinity from the second heat cycle is obtained according to ASTM D3418 assuming an enthalpy of melting of 14 cal/g for the cellulose esters.

The present application also discloses articles comprising the compositions and processes for preparing a film or a sheet comprising the compositions.

DETAILED DESCRIPTION OF THE INVENTION

The term "calendering" is used frequently in various industries to describe any process where a material is squeezed between two counter-rotating rolls. Many of these are outside the scope of the present invention, such as for example thermal bonding of fibers together by the pressure of the nip in order to make a fabric. Similar usage around binding powders and application of coatings to substrates exist. Other applications involve the embossing or de-glossing of an existing film or the smoothing of high spots in a film by passing it through a "calendering" set of rolls wherein one of the rolls is often flexible. In these instances, the calendering rolls may tend to warm/soften the film, but do not generally melt it to the point that it fully flows/mixes. These sorts of applications where a solid material or "pre-formed" substrate are passed through the nip simply to fuse, emboss, smooth and/or set the structure are not related to this invention. Examples of these include EP1024217, U.S. Pat. No. 6,565,787, WO2010055777 and WO2014169409.

Figure 1:
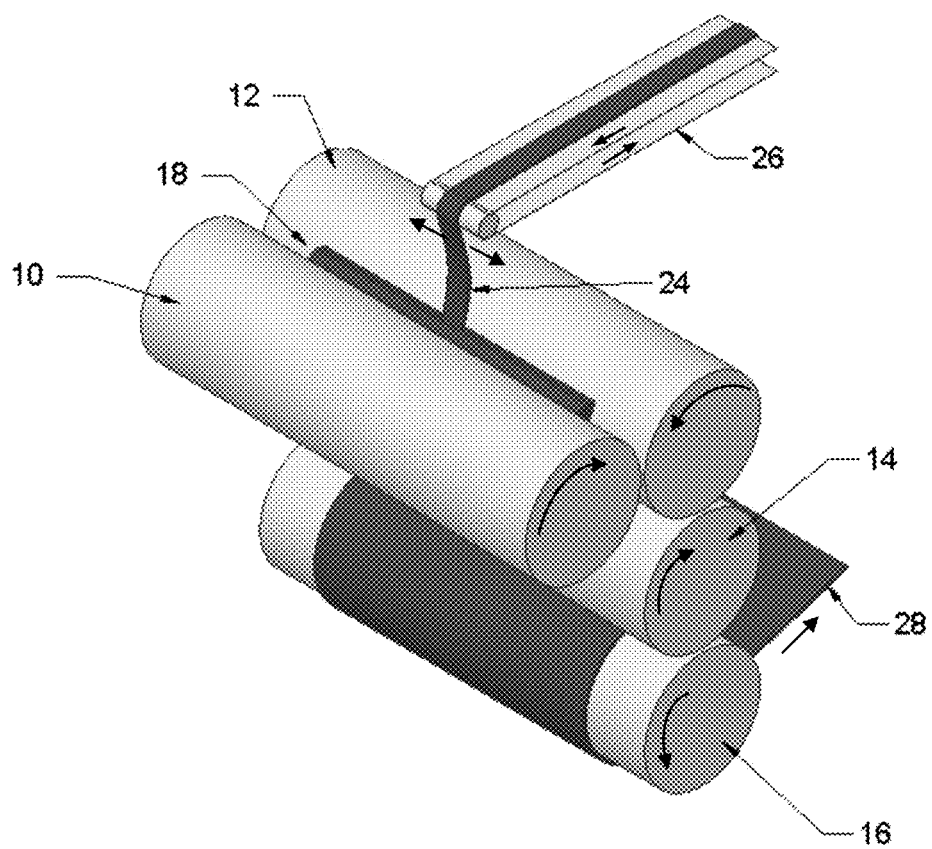
FIG. 1 is a schematic of the perspective view of a typical "inverted L" calendering line.
Figure 2:
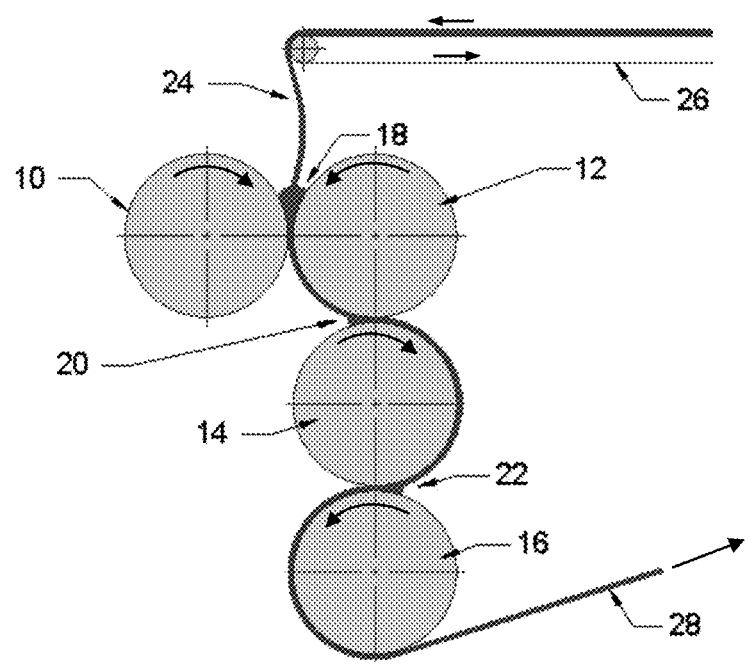
FIG. 2 is a schematic of the side view of an "inverted L" calendering line.

This invention pertains to "calendering" in the sense of producing a film or a sheet from a molten polymer where the molten polymer is forced through the nips of counterrotating rolls, and then gradually squeezed down to final thickness by optionally passing through additional rolls having a similar counterrotating arrangement. An illustration of a typical "inverted L" calendering stack is shown in FIG. 1 and FIG. 2. The polymer; usually in the form of a powder, a flake or other small granular structure; is melted and mixed with appropriate plasticizers, processing aids, stabilizers, colorants, release agents, fillers, etc. using a mixing device such as a Banbury mixer, kneader, extruder, or Farrell continuous mixer. This molten mass 24 can be applied to the calender in a batch process, or as shown in the figure, can be transferred to the calendering continuously such as with a conveying belt 26. The molten polymer is deposited into the top nip 18 between the top rolls 10 and 12. The molten polymer in the nip region or bank undergoes continued mixing. The conveyer typically moves back and forth to deposit polymer across the entire width of the roll, although the rolling of the bank of polymer will facilitate some of this spreading.

As the molten polymer passes through the first nip 18, it gets formed into the film having an initial thickness defined by the roll gap between 10 and 12. For purposes of definition we refer to roll 12 as the "front" or "first" roll as it is the roll that the polymer adheres to after exiting the nip. Likewise, roll 10 is the "back" or "second" roll as it helps direct the polymer into the nip, but does not otherwise convey material past the nip region. In order to make the film stick to roll 12, it is usually run hotter than 10 and/or at a higher speed. Typically, this front roll 12 is run 5 degrees or more hotter than the back roll 10 and usually at least about 5% faster.

The polymer goes into a second nip 20, where it get polished and squeezed further. As with nip 18, the roll 14 is usually run hotter and/or faster than 12 to facilitate transfer of the film. It is then conditioned on roll 14, before going through the final nip 22. After this final nip the finished film 28 is conveyed off to a winder, or optionally can go through additional treatment, such as stretching, annealing, slitting, etc.

There are a number of optional arrangements of calendering stacks besides the "inverted L", but the features are similar. In Calendering of Plastics (by R. A. Elden and A. D Swan, Elsevier, N.Y., 1971), there are described other setups including the three-roll and four roll superimposed, the three-roll offset, the four roll L-type, and the four roll Z-type, but the inverted L is the most common.

Figure 3A:
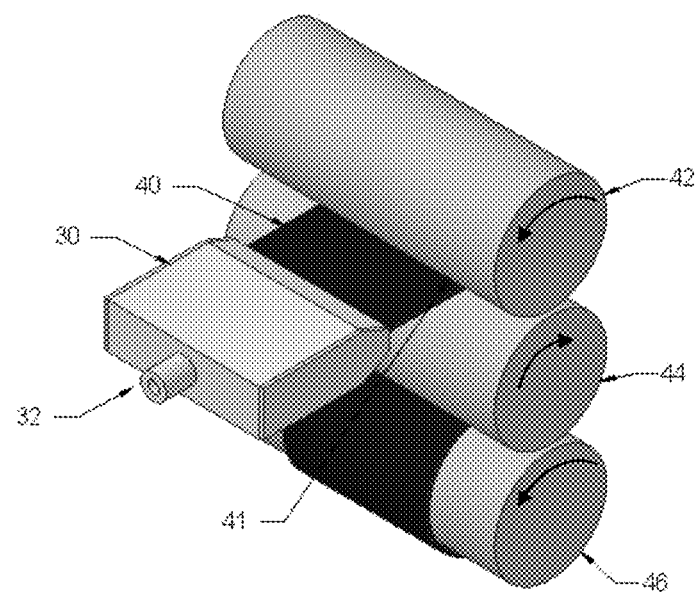
FIG. 3 is a schematic of a traditional extruded film die and rollstack.
Figure 3B:
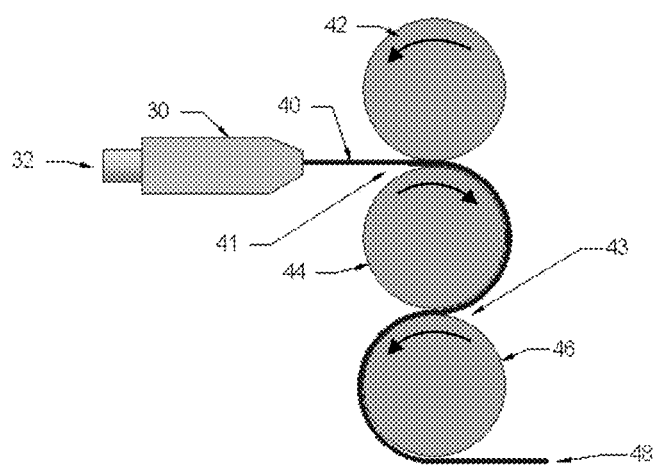

The present invention should also be distinguished from traditional film extrusion where a film die 30 deposits the film onto a "rollstack" such as shown in FIG. 3a and FIG. 3b. This rollstack with rolls 42, 44 and 46 is designed to "polish" the film and set the final gauge although it is sometimes referred to erroneously as "calendering".

In traditional film extrusion, the molten polymer is fed to the die via 32, and is spread within the die to final width using a "coathanger", T-slot, or similar type manifold configuration (not shown). The film 40 exits the die close to final target thickness. To achieve this film structure, it has to be be pumped under high pressure which usually requires a single screw extruder, or a twin screw extruder with a gear pump. Single screw extruders are the most common method and do not require a gear pump (although one can be included), but they do typically require pelletized or "large granular" material in order to feed properly. For materials like cellulose esters that are naturally produced in powder form, an additional pre-compounding step is required making this approach less financially attractive.

Once the film exits the die, it can either be deposited on a single casting roll, or directed into the top nip 41 of a rollstack (e.g. a 3-roll stack). Unlike calendering, it is important that the die produces a very uniform film at the die exit before reaching the rolls. Roll polishing will not correct errors in thickness as with traditional calendering since the bank is smaller and colder, and does not laterally move as much to fill in thin spots that might develop. There are also other differences between the processes. Although the rolls in both are counterrotating, roll temperatures in traditional film extrusion tend to be much colder than calendering, as the goal is to rapidly quench cool the polymer and prevent sticking to the roll surface. The rolls also tend to be rotating at the same speed, unlike calendering and the bank in the first nip tends to be much smaller as mentioned above. Likewise, there is usually no bank at the second nip 43 as the film is already solidified at this point. Typical roll temperatures for extrusion/polishing tend to be less than the $T_g$ of the polymer in order to solidify the material. In contrast, true calendering rolls are kept close to the melt or flow temperature to keep the polymer molten and mixing.

The requirements of a material for traditional film extrusion are much less stringent than calendering because the much lower roll temperatures make metal release easier and melt strength higher so the film web is easier to handle. However, it is much harder to achieve wider film widths while keeping tight gauge with extrusion/polishing. Calendering tends to have much higher throughput with wide webs and tight gauge control, but it is more expensive from a capital installation perspective.

Figure 4:
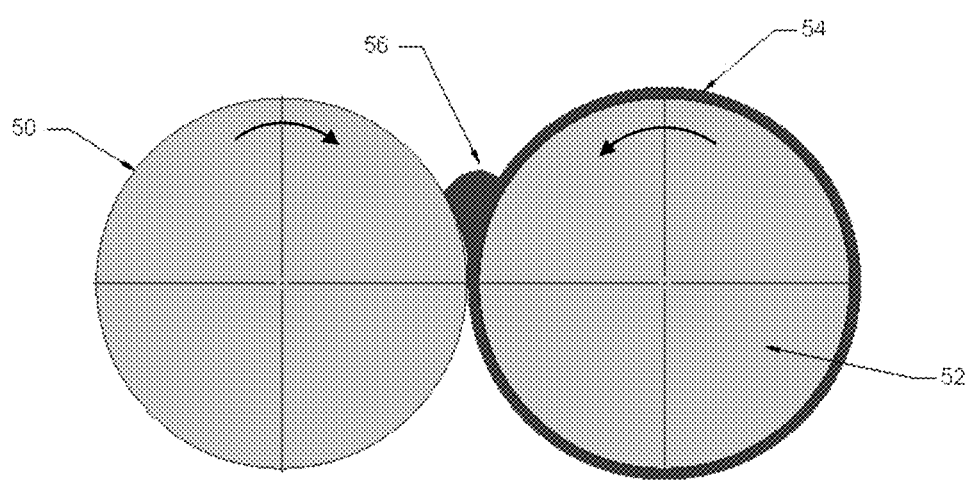
FIG. 4 is a schematic of the side view of a two roll mill.

One other analogous method to calendering is "roll milling" which typically involves only the top two rolls 50 and 52 of the inverted L stack shown in FIG. 1. A typical roll mill is shown in FIG. 4. Roll milling is essentially a calendering operation where the film 54 is fed back to the rolling bank 56 of polymer in an infinite loop. In this illustration, roll 52 is the "front" or "first" roll as it is the roll to which the polymer film adheres. Roll 50 is the back roll. As with a true calendering line, the front roll is run hotter and/or faster than the back roll in order to ensure film adhesion. Roll milling is used as an inexpensive way to mix ingredients into a formulation, but can also can make a nice proxy for understanding calenderability as is done in this invention.

Cellulose has three hydroxyls per anhydroglucose unit, located at the C2, C3 and C6 carbons, that can be esterified to varying degrees and in different ratios with various acyl groups. The resulting cellulose ester depends on the functionalization of the hydroxyl groups. For cellulose triacetate (CTA), effectively all of the hydroxyl groups are functionalized with acetyl groups. Therefore, the degree of substitution of the acetyl ("$DS_{Ac}$") for cellulose triacetate is approximately 2.90, and the degree of substitution of the hydroxyl ("$DS_{OH}$") is approximately 0.10. An idealized CTA would have a $DS_{Ac}$=3 and a $DS_{OH}$=0 but manufacturing limitations make it difficult to fully acetylate all of the reactive sites, so some residual hydroxyls remain present. Cellulose diacetate has a $DS_{Ac}$ of approximately 2.5 and a $DS_{OH}$ of approximately 0.5. Beyond the acetate family it is possible to incorporate longer acids such as propionic acid (e.g. cellulose propionate), butyric acid (e.g., cellulose butyrate), and even higher carbon acids (C4 and higher). Mixed esters are also possible such as cellulose acetate butyrate and cellulose acetate propionate.

The properties of the cellulose ester can be varied by the type of acyl group selected and the degree of substitution. For example, longer chain acyl groups tend to have lower glass transition temperatures than cellulose acetates. The degree of substitution of the substituents also affects the solubility, crystallinity, and density of the cellulose esters.

Compositions

In this section, the embodiments relating to the compositions will be discussed. The compositions can also be calendered to prepare articles such as films and sheets.

In one embodiment of the composition, the glass transition temperature that is in the range of from about 85° C. to about 195° C. In one embodiment of the composition, the glass transition temperature that is in the range of from about 170° C. to about 200° C.

In one embodiment of the composition, the ($C_{2-5}$)alkanoyl is chosen from acetyl, propanoyl, butyryl, isobutyryl, pivaloyl, pentanoyl, or 3-methylbutanoyl. In one embodiment of the composition, the ($C_{2-5}$)alkanoyl is chosen from acetyl, propionoyl, or butyryl. In one embodiment of the composition, the ($C_{2-5}$)alkanoyl is acetyl. In one embodiment of the composition, the ($C_{2-5}$)alkanoyl is propanoyl. In one embodiment of the composition, the ($C_{2-5}$)alkanoyl is butyryl.

In one embodiment of the composition, the degree of substitution of the hydroxyl substituent ("$DS_{OH}$") is in the range of about 0.4 to about 0.9. In one embodiment of the composition, the $DS_{OH}$ is in the range of about 0.4 to about 0.7.

The cellulose ester compositions of the present application are required to be melt processable at the calendering temperatures. If the crystallinity of the cellulose ester is too high, the cellulose ester composition will not process properly and will cause excessive pressure forces in the nip of the calendering rolls. Highly crystalline cellulose esters such as cellulose triacetate, cellulose tripropionate, and cellulose tributyrate are too crystalline to run on a calendering line. Likewise, cellulose esters with very low degrees of substitution of acyl groups are more like pure cellulose and are unprocessable. There is a need for a certain mix of side groups (i.e., hydroxyl, acetyl, propionyl, butyryl) in order to break up the crystallinity in the melt. Nevertheless, a small amount of thermal recrystallization is beneficial to the melt strength and roll release. However, excessive recrystallization is not acceptable because it will limit the melt fusion of the cellulose ester composition and cause poor film or sheet quality.

Plasticizers can slightly increase the amount of crystallization because they allow more chain mobility. For faster crystallizing cellulose acetates the crystallization levels were from about 5 to 10% higher than the unplasticized polymers. For slower crystallizing mixed esters such as cellulose acetate propionates and cellulose acetate butyrates, there is no noticeable effect.

For purposes of the present invention, this crystallization behavior can be characterized by a number of means. One method is to quantify the rate of crystallization in terms of the crystallization half-times of the polymer as in U.S. Pat. No. 6,551,688. This is an effective method, but is very time and labor intensive, thereby making screening more difficult. An alternate method used in the present invention is to measure the actual amount of crystallinity of the base polymer or powder under a prescribed heating history. For our purposes this heat history was that obtained from the "$2^{nd}$ cycle" cooling and heating in a DSC per ASTM D3418. By this method, the sample is first heated in the DSC to above its melting temperature to erase any prior crystallinity (i.e. the "first heat cycle"). Next the sample is cooled at 20 degrees C. per minute to below Tg, and then reheated at the same rate to above the melting temperature again (the "$2^{nd}$ heat cycle"). During this cooling and $2^{nd}$ heating, the material will recrystallize to a certain degree, and this amount of crystallization is measured in the scan as the enthalpy of melting at the melting temperature.

In one embodiment of the composition, the percent crystallinity of the cellulose ester obtained from the second heat cycle is less than about 15.0% as measured according to ASTM D3418 assuming an enthalpy of melting of 14 cal/g for the cellulose esters. In one embodiment of the composition, the percent crystallinity of the cellulose ester obtained from the second heat cycle is less than about 10.0% as measured according to ASTM D3418 assuming an enthalpy of melting of 14 cal/g for the cellulose esters. In one embodiment of the composition, the percent crystallinity of the cellulose ester obtained from the second heat cycle is less than about 5.0% as measured according to ASTM D3418 assuming an enthalpy of melting of 14 cal/g for the cellulose esters. In one embodiment of the composition, the percent crystallinity of the cellulose ester obtained from the second heat cycle is in the range of about 5.0% to about 10.0% as measured according to ASTM D3418 assuming an enthalpy of melting of 14 cal/g for the cellulose esters. In one embodiment of the composition, the percent crystallinity of the cellulose ester obtained from the second heat cycle is in the range of about 5.0% to about 15.0% as measured according to ASTM D3418 assuming an enthalpy of melting of 14 cal/g for the cellulose esters. In one embodiment of the composition, the percent crystallinity of the cellulose ester obtained from the second heat cycle is in the range of about 5.0% to about 20.0% as measured according to ASTM D3418 assuming an enthalpy of melting of 14 cal/g for the cellulose esters. In one embodiment of the composition, the percent crystallinity of the cellulose ester obtained from the second heat cycle is in the range of about 10.0% to about 20.0% as measured according to ASTM D3418 assuming an enthalpy of melting of 14 cal/g for the cellulose esters.

For the cellulose esters, it is possible to use a variety of molecular weights as a means for modifying viscosity. The melt viscosity is an important aspect of achieving good film quality that will be described herein.

In one embodiment of the composition, the cellulose ester has a number average molecular weight ("Mn") that is in the range of from about 20,000 Da to about 100,000 Da. In one embodiment of the composition, the cellulose ester has a Mn that is in the range of from about 20,000 Da to about 80,000 Da.

Cellulose esters are usually processed with a plasticizer to enhance flow characteristics and to soften and toughen the material. For materials like cellulose acetate, plasticizers are required because the glass transition temperature of cellulose acetates are around about 180° C. to about 190° C. depending on the molecular weight. The processing temperatures required to melt cellulose acetates are sufficiently hot to degrade the polymer excessively if a plasticizer is not used. On the other hand, mixed cellulose esters like cellulose acetate propionate, cellulose acetate butyrate and longer chain acid esters can be run with little or no plasticizer as the base polymer glass transition temperature can be much lower (i.e., 140-160° C. for CAPs, 80-160° C. for CABs). When plasticizers are used, the typical levels range from about 1.0 wt % to upwards of 40 wt %, but higher levels can be utilized to make plastisol-like materials. The types of plasticizers may vary depending on the cellulose esters used, but the most common families of plasticizers are phthalates, fatty acid esters (i.e., oleates, adipates, fumarates. sebecates, maleates, succinates), polyalcohol ethers or esters (i.e., esters of glycerol, esters or ethers of polyethylene glycol), benzoates, azelates, citrates, phosphates, trimellitates (i.e., trimellitic acid tributyl ester, trioctyl trimellitate), and the like.

In one embodiment of the composition, the cellulose ester is chosen from cellulose acetate, cellulose propionate, cellulose butyrate, cellulose acetate propionate, or cellulose acetate butyrate. In one embodiment of the composition, the cellulose ester is chosen from cellulose acetate, cellulose acetate propionate, or cellulose acetate butyrate. In one embodiment of the composition, the cellulose ester is cellulose acetate. In one embodiment of the composition, the cellulose ester is cellulose acetate propionate. In one embodiment of the composition, the cellulose ester is cellulose acetate butyrate. In one embodiment of the composition, the cellulose ester is cellulose propionate. In one embodiment of the composition, the cellulose ester is cellulose butyrate.

In one embodiment of the composition, the plasticizer is present in the composition in the ragne of from about 5.0 wt % to about 20.0 wt % based on the total weight of the composition. In one embodiment of the composition, the plasticizer is present in the composition in the range of from about 10.0 wt % to about 35.0 wt % based on the total weight of the composition. In one embodiment of the composition, the plasticizer is present in the composition in the range of from about 15.0 wt % to about 30.0 wt % based on the total weight of the composition. In one embodiment of the composition, the plasticizer is chosen from a phthalate, a fatty acid ester, a polyalcohol ether, a polyalcohol ester, a benzoate, an azelate, a citrate, a phosphate, or a trimellitate. In one class of this embodiment, the plasticizer is a phthalate. In one class of this embodiment, the plasticizer is a fatty acid ester. In one class of this embodiment, the plasticizer is a polyalcohol ether. In one class of this embodiment, the plasticizer is a polyalcohol ester. In one class of this embodiment, the plasticizer is a benzoate. In one class of this embodiment, the plasticizer is an azelate. In one class of this embodiment, the plasticizer is a citrate. In one class of this embodiment, the plasticizer is a phosphate. In one class of this embodiment, the plasticizer is a trimellitate. In one class of this embodiment, the plasticizer is chosen from triethylene glycol bis-ethylhexanoate ("TEG-EH"), triacetin, acetyl trietyl citrate, or dioctyl adipate.

Roll release agents, such as lubricants, plasticizers, or waxes, are used as additives for the polymer compositions to aid in the release of the calendered films or sheets from the calendering rolls. Roll release agents are not always required, but many polymer compositions require a low viscosity in order to achieve smooth, melt fracture free surfaces after being calendered. However, low viscosity polymer compositions tend to be sticky and such films or sheets tend to deform or stretch when peeled off of the calendering rolls.

There are a number of roll release agents that are known in the art. U.S. Pat. No. 6,551,688 discloses combinations of fatty acids and ester waxes that provide low haze and good roll release properties when added to polymer compositions. Polyesters have a high refractive index comparable to PVC so refractive index mismatch with waxes increases film haze. Many waxes have a refractive index that is close to those of cellulose esters. As a result, the haze of cellulose ester/wax compositions are low.

When roll release agents are used the typical levels range from about 0.1 wt % to about 2.0 wt % based on the total weight of the composition. Examples of roll release agents include esters of fatty acids (e.g. montanic acid), fatty acids or fatty acid salts (i.e., sodium salt).

In one embodiment the composition, the roll release agent is present in the composition in the range of from about 0.1 wt % to about 1.0 wt % based on the total weight of the composition. In one embodiment of the composition, the roll release agent is present in the composition in the range of from about 0.1 wt % to about 0.5 wt % based on the total weight of the composition. In one embodiment of the composition, the roll release agent is present in the composition in the range of from about 0.5 wt % to about 1.0 wt % based on the total weight of the composition. In one embodiment of the composition, the roll release agent is present in the composition in the range of from about 1.0 wt % to about 2.0 wt % based on the total weight of the composition. In one embodiment of the composition, the roll release agent is present in the composition in the range of from about 1.5 wt % to about 2.0 wt % based on the total weight of the composition.

In one embodiment of the composition, the roll release agent is chosen from a lubricant or a wax. In one class of this embodiment, the roll release agent is an ester of a fatty acid. In one subclass of this class, the roll release agent is an ester of montanic acid. In one sub-subclass of this subclass, the ester of montanic acid is chosen from butylene glycol ester of montanic acid, glycerol ester of montanic acid, pentaerythryitol ester of montanic acid. In one class of this embodiment, the roll release agent is an amide wax. The roll release agent can be a combination of different roll release agents that improve release while helping to maintain better clarity.

There are a number of processing aids that are known in the art and that have been found to be beneficial to calendering of cellulose esters. Processing aids help to improve the texture and "fusion" of the melt, and to improve melt strength. Processing aids reduce the melting time of the polymer compositions and help to distribute the polymer thereby reducing overall processing time. Processing aids also help with metal release from the calendering rolls. The most common processing aids are derived from acrylics, and acrylic copolymers although processing aids based on styrenics, carbonates, polyesters, other olefins, and siloxanes are also available. The refractive index of acrylic and acrylic copolymer processing aids are closely matched with cellulose esters which results in low haze. The level of processing aid used varies. It is also noted that processing aids come in a wide variety of molecular weights and viscosities, and choice will depend on the materials being processed and the target application. An example of a typical processing aid includes the Kaneka Kane-Ace® acrylic processing aids (Kaneka Corporation, Pasadena, Tex.).

In one embodiment of the composition, the processing aid is present in the composition in the range of from about 0 wt % to about 3.0 wt % based on the total weight of the composition. In one embodiment of the composition, the processing aid is present in the composition in the range of from about 0.1 wt % to about 6.0 wt % based on the total weight of the composition. In one embodiment of the composition, the processing aid is present in the composition in the range of from about 0.5 wt % to about 6.0 wt % based on the total weight of the composition. In one embodiment of the composition, the processing aid is present in the composition in the range of from about 0.5 wt % to about 3.0 wt % based on the total weight of the composition.

In one embodiment of the composition, the processing aid comprises an acrylic polymer, an acrylic copolymer, a styrenic polymer, a carbonate polymer, a polyester polymer, an olefin polymer, or a siloxane polymer. In one embodiment of the composition, the processing aid comprises an acrylic polymer or an acrylic copolymer. In one embodiment, the processing aid comprises a Kane-Ace® acrylic processing aid. In one class of this embodiment, the processing aid is Paraloid™ K-125, Kane-Ace® PA-20, Kane-Ace® PA-610, Kane-Ace® B622, Kane-Ace® MR01, Kane-Ace® MP90, epoxidized soybean oil, or Eastman™ Ecdel.

In another embodiment of the present invention, the composition also includes an impact modifier preferably in a range of from about 1 to about 20 wt %. Examples of impact modifiers include core-shell polymers based on acrylic including methacrylate butadiene styrene (MBS), all acrylic, and silicone-acrylic. Other impact modifiers include acrylonitrile-butadiene styrene (ABS), ethylene vinyl acetate copolymers, chlorinated polyethylenes as well as ethylene copolymers. Impact modifiers can optionally be chosen so as to match the refractive index of base polymer to minimize haze.

Another aspect of the invention (which will be discussed further in the processing section), is making smooth films that are free of melt fracture or surface roughening. Rough surfaces are not typically acceptable for most commercial applications because they lack the necessary transparency. In order to achieve this smooth high quality film, it was found that the melt viscosity of the composition in the nip region of the calender must be below a certain range. For a typical PVC-type calendering line, the maximum temperature in the nip is about 190° C. and the shear rate is about 628 $s^{-1}$ between the rolls.

In one embodiment of the composition, the composition has a melt viscosity according to ASTM 3835 in the range of from about 1000 Poise to about 5000 Poise at a temperature of 190° C. and a shear rate of 628 $s^{-1}$. In one class of this embodiment, the composition is capable of being calendered at the temperature range of the sum of the glass transition temperature of the cellulose ester minus 20° C. to about the sum of the glass transition temperature of the cellulose ester plus 50° C. In one subclass of this class, the (C$_{2-5}$)alkanoyl substituents is chosen from acetyl, propionyl, or butyryl.

In one class of this embodiment, the composition is capable of being calendered at the temperature range of the sum of the glass transition temperature of the cellulose ester minus 20° C. to about the sum of the glass transition temperature of the cellulose ester plus 20° C. In one subclass of this class, the (C$_{2-5}$)alkanoyl substituents is chosen from acetyl, propionyl, or butyryl.

In one class of this embodiment, the composition is capable of being calendered at the temperature range of the glass transition temperature of the cellulose ester to about the sum of the glass transition temperature of the cellulose ester plus 20° C. In one subclass of this class, the (C$_{2-5}$) alkanoyl substituents is chosen from acetyl, propionyl, or butyryl.

In one class of this embodiment, the percent crystallinity of the cellulose ester obtained from the second heat cycle is less than about 15.0% as measured according to ASTM D3418 assuming an enthalpy of melting of 14 cal/g for the cellulose esters. In one class of this embodiment, the percent crystallinity of the cellulose ester obtained from the second heat cycle is less than about 10.0% as measured according to ASTM D3418 assuming an enthalpy of melting of 14 cal/g for the cellulose esters. In one class of this embodiment, the percent crystallinity of the cellulose ester obtained from the second heat cycle is less than about 5.0% as measured according to ASTM D3418 assuming an enthalpy of melting of 14 cal/g for the cellulose esters. In one class of this embodiment, the percent crystallinity of the cellulose ester obtained from the second heat cycle is in the range of from about 5.0% to about 10.0% as measured according to ASTM D3418 assuming an enthalpy of melting of 14 cal/g for the cellulose esters. In one class of this embodiment, the percent crystallinity of the cellulose ester obtained from the second heat cycle is in the range of from about 5.0% to about 15.0% as measured according to ASTM D3418 assuming an enthalpy of melting of 14 cal/g for the cellulose esters.

In one embodiment of the composition, the composition has a melt viscosity according to ASTM 3835 in the range of from about 2000 Poise to about 5000 Poise at a temperature of 190° C. and a shear rate of 628 s$^{-1}$. In one class of this embodiment, the composition is capable of being calendered at the temperature range of the sum of the glass transition temperature of the cellulose ester minus 20° C. to about the sum of the glass transition temperature of the cellulose ester plus 50° C. In one subclass of this class, the (C$_{2-5}$)alkanoyl substituents is chosen from acetyl, propionyl, or butyryl.

In one class of this embodiment, the composition is capable of being calendered at the temperature range of the sum of the glass transition temperature of the cellulose ester minus 20° C. to about the sum of the glass transition temperature of the cellulose ester plus 20° C. In one subclass of this class, the (C$_{2-5}$)alkanoyl substituents is chosen from acetyl, propionyl, or butyryl.

In one class of this embodiment, the composition is capable of being calendered at the temperature range of the glass transition temperature of the cellulose ester to about the sum of the glass transition temperature of the cellulose ester plus 20° C. In one subclass of this class, the (C$_{2-5}$) alkanoyl substituents is chosen from acetyl, propionyl, or butyryl.

In one class of this embodiment, the percent crystallinity of the cellulose ester obtained from the second heat cycle is less than about 15.0% as measured according to ASTM D3418 assuming an enthalpy of melting of 14 cal/g for the cellulose esters. In one class of this embodiment, the percent crystallinity of the cellulose ester obtained from the second heat cycle is less than about 10.0% as measured according to ASTM D3418 assuming an enthalpy of melting of 14 cal/g for the cellulose esters. In one class of this embodiment, the percent crystallinity of the cellulose ester obtained from the second heat cycle is less than about 5.0% as measured according to ASTM D3418 assuming an enthalpy of melting of 14 cal/g for the cellulose esters. In one class of this embodiment, the percent crystallinity of the cellulose ester obtained from the second heat cycle is in the range of from about 5.0% to about 10.0% as measured according to ASTM D3418 assuming an enthalpy of melting of 14 cal/g for the cellulose esters. In one class of this embodiment, the percent crystallinity of the cellulose ester obtained from the second heat cycle is in the range of from about 5.0% to about 15.0% as measured according to ASTM D3418 assuming an enthalpy of melting of 14 cal/g for the cellulose esters.

In one embodiment of the composition, the composition has a melt viscosity according to ASTM 3835 in the range of from about 2000 Poise to about 4000 Poise at a temperature of 190° C. and a shear rate of 628 s$^{-1}$. In one class of this embodiment, the composition is capable of calendered at the temperature range of the sum of the glass transition temperature of the cellulose ester minus 20° C. to about the sum of the glass transition temperature of the cellulose ester plus 50° C. In one subclass of this class, the (C$_{2-5}$)alkanoyl substituents is chosen from acetyl, propionyl, or butyryl.

In one class of this embodiment, the composition is capable of being calendered at the temperature range of the sum of the glass transition temperature of the cellulose ester minus 20° C. to about the sum of the glass transition temperature of the cellulose ester plus 20° C. In one subclass of this class, the (C$_{2-5}$)alkanoyl substituents is chosen from acetyl, propionyl, or butyryl.

In one class of this embodiment, the composition is capable of being calendered at the temperature range of the glass transition temperature of the cellulose ester to about the sum of the glass transition temperature of the cellulose ester plus 20° C. In one subclass of this class, the (C$_{2-5}$) alkanoyl substituents is chosen from acetyl, propionyl, or butyryl.

In one class of this embodiment, the percent crystallinity of the cellulose ester obtained from the second heat cycle is less than about 15.0% as measured according to ASTM D3418 assuming an enthalpy of melting of 14 cal/g for the cellulose esters. In one class of this embodiment, the percent crystallinity of the cellulose ester obtained from the second heat cycle is less than about 10.0% as measured according to ASTM D3418 assuming an enthalpy of melting of 14 cal/g for the cellulose esters. In one class of this embodiment, the percent crystallinity of the cellulose ester obtained from the second heat cycle is less than about 5.0% as measured according to ASTM D3418 assuming an enthalpy of melting of 14 cal/g for the cellulose esters. In one class of this embodiment, the percent crystallinity of the cellulose ester obtained from the second heat cycle is in the range of from about 5.0% to about 10.0% as measured according to ASTM D3418 assuming an enthalpy of melting of 14 cal/g for the cellulose esters. In one class of this embodiment, the percent crystallinity of the cellulose ester obtained from the second heat cycle is in the range of from about 5.0% to about 15.0% as measured according to ASTM D3418 assuming an enthalpy of melting of 14 cal/g for the cellulose esters.

In one embodiment of the composition, the degree of substitution of the hydroxyl substituent ("$DS_{OH}$") is in the range of about 0.4 to about 0.9.

In one class of this embodiment, the composition has a melt viscosity according to ASTM 3835 in the range of from about 1000 Poise to about 5000 Poise at a temperature of 190° C. and a shear rate of 628 $s^{-1}$. In one subclass of this class, the percent crystallinity of the cellulose ester obtained from the second heat cycle is less than about 15.0% as measured according to ASTM D3418 assuming an enthalpy of melting of 14 cal/g for the cellulose esters. In one subclass of this class, the percent crystallinity of the cellulose ester obtained from the second heat cycle is less than about 10.0% as measured according to ASTM D3418 assuming an enthalpy of melting of 14 cal/g for the cellulose esters. In one subclass of this class, the percent crystallinity of the cellulose ester obtained from the second heat cycle is less than about 5.0% as measured according to ASTM D3418 assuming an enthalpy of melting of 14 cal/g for the cellulose esters. In one subclass of this class, the percent crystallinity of the cellulose ester obtained from the second heat cycle is in the range of from about 5.0% to about 10.0% as measured according to ASTM D3418 assuming an enthalpy of melting of 14 cal/g for the cellulose esters. In one subclass of this class, the percent crystallinity of the cellulose ester obtained from the second heat cycle is in the range of from about 5.0% to about 15.0% as measured according to ASTM D3418 assuming an enthalpy of melting of 14 cal/g for the cellulose esters.

In one class of this embodiment, the composition has a melt viscosity according to ASTM 3835 in the range of from about 2000 Poise to about 4000 Poise at a temperature of 190° C. and a shear rate of 628 $s^{-1}$. In one subclass of this class, the percent crystallinity of the cellulose ester obtained from the second heat cycle is less than about 15.0% as measured according to ASTM D3418 assuming an enthalpy of melting of 14 cal/g for the cellulose esters. In one subclass of this class, the percent crystallinity of the cellulose ester obtained from the second heat cycle is less than about 10.0% as measured according to ASTM D3418 assuming an enthalpy of melting of 14 cal/g for the cellulose esters. In one subclass of this class, the percent crystallinity of the cellulose ester obtained from the second heat cycle is less than about 5.0% as measured according to ASTM D3418 assuming an enthalpy of melting of 14 cal/g for the cellulose esters. In one subclass of this class, the percent crystallinity of the cellulose ester obtained from the second heat cycle is in the range of from about 5.0% to about 10.0% as measured according to ASTM D3418 assuming an enthalpy of melting of 14 cal/g for the cellulose esters. In one subclass of this class, the percent crystallinity of the cellulose ester obtained from the second heat cycle is in the range of from about 5.0% to about 15.0% as measured according to ASTM D3418 assuming an enthalpy of melting of 14 cal/g for the cellulose esters.

In one class of this embodiment, the percent crystallinity of the cellulose ester obtained from the second heat cycle is less than about 15.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-subclass of this sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 5.0 wt % to about 20.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-subclass of this sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is less than about 10.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 5.0 wt % to about 20.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is less than about 5.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 5.0 wt % to about 20.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-sub-subclass of this sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is in the range of about 5.0% to about 10.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-subclass of this sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 5.0 wt % to about 20.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-subclass of this sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is in the range of about 5.0% to about 15.0% as measured according to ASTM D3418 assuming an enthalpy of melting of 14 Cal/g for the cellulose esters.

In one subclass of this class, the plasticizer is present in the composition in the range of from about 10.0 wt % to about 35.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-subclass of this sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 5.0 wt % to about 20.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-subclass of this sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is in the range of about 5.0% to about 20.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-subclass of this sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 5.0 wt % to about 20.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-subclass of this sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is in the range of about 10.0% to about 20.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-subclass of this sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 5.0 wt % to about 20.0 wt % based on the total weight of the composition.

In one sub-subclass of this subclass, the plasticizer is chosen from a phthalate, a fatty acid ester, a polyalcohol ether, a polyalcohol ester, a benzoate, an azelate, a citrate, a phosphate, or a trimellitate. In one sub-sub-subclass of this sub-subclass, the roll release agent is an ester of a fatty acid. In one sub-sub-subclass of this sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.5 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the composition is capable of being calendered at the temperature range from about the sum of the glass transition temperature of the cellulose ester minus 20° C. to about the sum of the glass transition temperature of the cellulose ester plus 50° C.

In one subclass of this class, the glass transition temperature of the cellulose ester is in the range of from about 85° C. to about 195° C. In one sub-subclass of this subclass, the cellulose ester is a cellulose propionate, a cellulose acetate propionate, a cellulose butyrate, or a cellulose acetate butyrate. In one sub-subclass of this subclass, the cellulose ester is cellulose acetate propionate. In one sub-subclass of this subclass, the cellulose ester is cellulose acetate butyrate.

In one subclass of this class, the glass transition temperature of the cellulose ester is in the range of from about 170° C. to about 200° C. In one sub-subclass of this subclass, the cellulose ester is a cellulose acetate.

In one class of this embodiment, the composition is capable of being calendered at the temperature range of the sum of the glass transition temperature of the cellulose ester minus 20° C. to about the sum of the glass transition temperature of the cellulose ester plus 20° C.

In one subclass of this class, the glass transition temperature of the cellulose ester is in the range of from about 85° C. to about 195° C. In one sub-subclass of this subclass, the cellulose ester is a cellulose propionate, a cellulose acetate propionate, a cellulose butyrate, or a cellulose acetate butyrate. In one sub-subclass of this subclass, the cellulose ester is cellulose acetate propionate. In one sub-subclass of this subclass, the cellulose ester is cellulose acetate butyrate.

In one subclass of this class, the glass transition temperature of the cellulose ester is in the range of from about 170° C. to about 200° C. In one sub-subclass of this subclass, the cellulose ester is a cellulose acetate.

In one class of this embodiment, the composition is capable of being calendered at the temperature range of the about the glass transition temperature of the cellulose ester to about the sum of the glass transition temperature of the cellulose ester plus 20° C.

In one subclass of this class, the glass transition temperature of the cellulose ester is in the range of from about 85° C. to about 195° C. In one sub-subclass of this subclass, the cellulose ester is a cellulose propionate, a cellulose acetate propionate, a cellulose butyrate, or a cellulose acetate butyrate. In one sub-subclass of this subclass, the cellulose ester is cellulose acetate propionate. In one sub-subclass of this subclass, the cellulose ester is cellulose acetate butyrate.

In one subclass of this class, the glass transition temperature of the cellulose ester is in the range of from about 170° C. to about 200° C. In one sub-subclass of this subclass, the cellulose ester is a cellulose acetate.

In one embodiment of the composition, the $DS_{OH}$ is in the range of about 0.4 to about 0.7.

In one class of this embodiment, the composition has a melt viscosity according to ASTM 3835 in the range of from about 1000 Poise to about 5000 Poise at a temperature of 190° C. and a shear rate of 628 $s^{-1}$. In one subclass of this class, the percent crystallinity of the cellulose ester obtained from the second heat cycle is less than about 15.0% as measured according to ASTM D3418 assuming an enthalpy of melting of 14 cal/g for the cellulose esters. In one subclass of this class, the percent crystallinity of the cellulose ester obtained from the second heat cycle is less than about 10.0% as measured according to ASTM D3418 assuming an enthalpy of melting of 14 cal/g for the cellulose esters. In one subclass of this class, the percent crystallinity of the cellulose ester obtained from the second heat cycle is less than about 5.0% as measured according to ASTM D3418. In one subclass of this class, the percent crystallinity of the cellulose ester obtained from the second heat cycle is in the range of from about 5.0% to about 10.0% as measured according to ASTM D3418 assuming an enthalpy of melting of 14 cal/g for the cellulose esters. In one subclass of this class, the percent crystallinity of the cellulose ester obtained from the second heat cycle is in the range of from about 5.0% to about 15.0% as measured according to ASTM D3418 assuming an enthalpy of melting of 14 cal/g for the cellulose esters.

In one class of this embodiment, the composition has a melt viscosity according to ASTM 3835 in the range of from about 1000 Poise to about 5000 Poise at a temperature of 190° C. and a shear rate of 628 $s^{-1}$. In one subclass of this class, the percent crystallinity of the cellulose ester obtained from the second heat cycle is less than about 15.0% as measured according to ASTM D3418 assuming an enthalpy of melting of 14 cal/g for the cellulose esters. In one subclass of this class, the percent crystallinity of the cellulose ester obtained from the second heat cycle is less than about 10.0% as measured according to ASTM D3418 assuming an enthalpy of melting of 14 cal/g for the cellulose esters. In one subclass of this class, the percent crystallinity of the cellulose ester obtained from the second heat cycle is less than about 5.0% as measured according to ASTM D3418 assuming an enthalpy of melting of 14 cal/g for the cellulose esters. In one subclass of this class, the percent crystallinity of the cellulose ester obtained from the second heat cycle is in the range of from about 5.0% to about 10.0% as measured according to ASTM D3418 assuming an enthalpy of melting of 14 cal/g for the cellulose esters. In one subclass of this class, the percent crystallinity of the cellulose ester obtained from the second heat cycle is in the range of from about 5.0% to about 15.0% as measured according to ASTM D3418 assuming an enthalpy of melting of 14 cal/g for the cellulose esters.

In one subclass of this class, the plasticizer is present in the composition in the range of from about 5.0 wt % to about 20.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is less than about 10.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is less than about 5.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is in the range of about 5.0% to about 10.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is in the range of about 5.0% to about 15.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is in the range of about 5.0% to about 20.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the percent crystallinity of the cellulose ester obtained from the second heat cycle is in the range of about 10.0% to about 20.0% as measured according to ASTM D3418 assuming an enthalpy of melting of 14 cal/g for the cellulose esters.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 10.0 wt % to about 35.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one subclass of this class, the plasticizer is present in the composition in the range of from about 15.0 wt % to about 30.0 wt % based on the total weight of the composition.

In one sub-subclass of this subclass, the roll release agent is present in the composition in the range of from about 0.1 wt % to about 2.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one sub-subclass of this subclass, the roll release agent is present in the composition in the range of from about 0.1 wt % to about 1.0 wt % based on the total weight of the composition. In one sub-sub-subclass of this sub-subclass, the plasticizer is chosen from a phthalate, a fatty acid ester, a polyalcohol ether, a polyalcohol ester, a benzoate, an azelate, a citrate, a phosphate, or a trimellitate. In one sub-sub-sub-subclass of this sub-sub-subclass, the roll release agent is an ester of a fatty acid. In one sub-sub-sub-subclass of this sub-sub-subclass, the roll release agent is an ester of montanic acid.

In one class of this embodiment, the composition is capable of being calendered at the temperature range from about the sum of the glass transition temperature of the cellulose ester minus 20° C. to about the sum of the glass transition temperature of the cellulose ester plus 50° C.

In one subclass of this class, the glass transition temperature of the cellulose ester is in the range of from about 85° C. to about 195° C. In one sub-subclass of this subclass, the cellulose ester is a cellulose propionate, a cellulose acetate propionate, a cellulose butyrate, or a cellulose acetate butyrate. In one sub-subclass of this subclass, the cellulose ester is cellulose acetate propionate. In one sub-subclass of this subclass, the cellulose ester is cellulose acetate butyrate.

In one subclass of this class, the glass transition temperature of the cellulose ester is in the range of from about 170° C. to about 200° C. In one sub-subclass of this subclass, the cellulose ester is a cellulose acetate.

In one class of this embodiment, the composition is capable of being calendered at the temperature range of the sum of the glass transition temperature of the cellulose ester minus 20° C. to about the sum of the glass transition temperature of the cellulose ester plus 20° C.

In one subclass of this class, the glass transition temperature of the cellulose ester is in the range of from about 85° C. to about 195° C. In one sub-subclass of this subclass, the cellulose ester is a cellulose propionate, a cellulose acetate propionate, a cellulose butyrate, or a cellulose acetate butyrate. In one sub-subclass of this subclass, the cellulose ester is cellulose acetate propionate. In one sub-subclass of this subclass, the cellulose ester is cellulose acetate butyrate.

In one subclass of this class, the glass transition temperature of the cellulose ester is in the range of from about 170° C. to about 200° C. In one sub-subclass of this subclass, the cellulose ester is a cellulose acetate.

In one class of this embodiment, the composition is capable of being calendered at the temperature range of the about the glass transition temperature of the cellulose ester to about the sum of the glass transition temperature of the cellulose ester plus 20° C.

In one subclass of this class, the glass transition temperature of the cellulose ester is in the range of from about 85° C. to about 195° C. In one sub-subclass of this subclass, the cellulose ester is a cellulose propionate, a cellulose acetate propionate, a cellulose butyrate, or a cellulose acetate butyrate. In one sub-subclass of this subclass, the cellulose ester is cellulose acetate propionate. In one sub-subclass of this subclass, the cellulose ester is cellulose acetate butyrate.

In one subclass of this class, the glass transition temperature of the cellulose ester is in the range of from about 170° C. to about 200° C. In one sub-subclass of this subclass, the cellulose ester is a cellulose acetate.

In one embodiment of the composition, the composition is capable of being calendered at the temperature range from about the sum of the glass transition temperature of the cellulose ester minus 20° C. to about the sum of the glass transition temperature of the cellulose ester plus 50° C. In one class of this embodiment, the composition is capable of being calendered at the temperature range of the sum of the glass transition temperature of the cellulose ester minus 20° C. to about the sum of the glass transition temperature of the cellulose ester plus 20° C. In one embodiment of the composition, the composition is capable of being calendered at the temperature range of the about the glass transition temperature of the cellulose ester to about the sum of the glass transition temperature of the cellulose ester plus 20° C.

In one embodiment of the composition, the plasticizer is present in the composition in the range of from about 5.0 wt % to 20 wt % based on the total weight of the composition, the roll realease agent is present in the composition in the range of from about 0.5 wt % to about 1.0 wt % based on the total weight of the composition; and the processing aid is present in the composition in the range of from about 1.0 wt % to about 3 wt % based on the total weight of the composition.

Articles

The compositions disclosed herein can be used to prepare articles such as sheets and films. In one embodiment of the article, the article is a film having a thickness in the range of from about 10 microns to about 800 microns. In one embodiment of the article, the article is a sheet having a thickness in the range of from about 20 microns to about 500 microns.

Films and sheets prepared from the compositions disclosed in the present application are smooth with little to no melt fracture.

It is understood by those skilled in the art that the compositions and processing conditions can be further adjusted with a calendering line to modify the properties for different applications. For example, fillers, foaming agents, antistatic agents, pigments, flame retardants, UV absorbers/stabilizers, impact modifiers, colorants, frosting agents, and so forth can be included to modify the films characteristics. Similarly, the orientation level of the film can be adjusted to modify properties or to even create a cellulose ester shrink film, as might be useful for packaging/labeling or protective wrapping. The applications for these films will also be comparable to those of PVC and include rigid, semirigid and flexible structures. Examples include, but are not limited to, packaging, flooring, tapes, graphic art films, wall coverings, optical films, furniture laminates, architectural films, foams, transfer and protective films, thermoforming applications apparel (e.g. rain protection) and so forth.

Cellulose esters also bring some unique properties that are not possible with PVC, including biodegradablity and compostability, natural antistatic properties and bio/renewable contect. It is also inherently UV resistant making it more ideal for outdoor applications. So this can extend cellulose esters into for example, outdoor films and signage requiring weathering resistance, or by proper choice of cellulose ester, to applications requiring biodegradation over time.

Processes

High quality films and sheets that are smooth, with little or no melt fracture are desirable. Melt fracture, also known as "sharkskin" or "chevrons" is a periodic roughness on the surface of the film caused by excessive shearing between the polymer and the surface of the roll. Melt fracture occurs in calendering and other types of processes when shear stresses of the polymer exceed a certain threshold next to the metal surface. For cellulose esters the threshold has been found to be about 0.1 to 0.2 MPa. Therefore, melt fracture can be eliminated by reducing shear stress below this threshold, which in turn means either running slower and/or running a lower viscosity material. Increasing the temperature can be a means of reducing viscosity and therefore shear stress.

Running lower viscosities to limit melt fracture introduces a new problem, namely the material will tend to be more prone to sticking to the roll. Low melt viscosities both increase the contact between polymer and metal, thereby increasing adhesion, while also making the film removal difficulty because the film too pliable and "stringy" Therefore finding a balance between low melt fracture and good metal release is needed for calendering.

Shear stresses and shear rates tend to be highest in the nip of the calendering rolls. The effective shear rate yen in the nip can be estimated by $$\gamma_{\mathit{eff}} \sim \frac{V_f}{h}$$

where $V_f$ is the velocity of the front roll surface in cm/s. The front roll velocity is $V_f=2\pi R*RPM/60$ where R is the diameter of the roll (cm) and RPM is the speed in rotations per minute. The gap between the rolls is h (cm). This maximum shear rate will vary slightly if the roll speeds are different from each other (e.g. friction) but the effect is small and can be neglected for present purposes.

The shear stress π (units of MPa), at the wall is what is important for determining melt fracture and it is calculated as $$\pi = \eta * \gamma_{\mathit{eff}} * 10^{-7}$$

where η is the viscosity of the melt at the temperature and shear rate of processing in units of Poise. The factor of $10^{-7}$ provides unit conversion to megaPascals (MPa).

Figure 5:
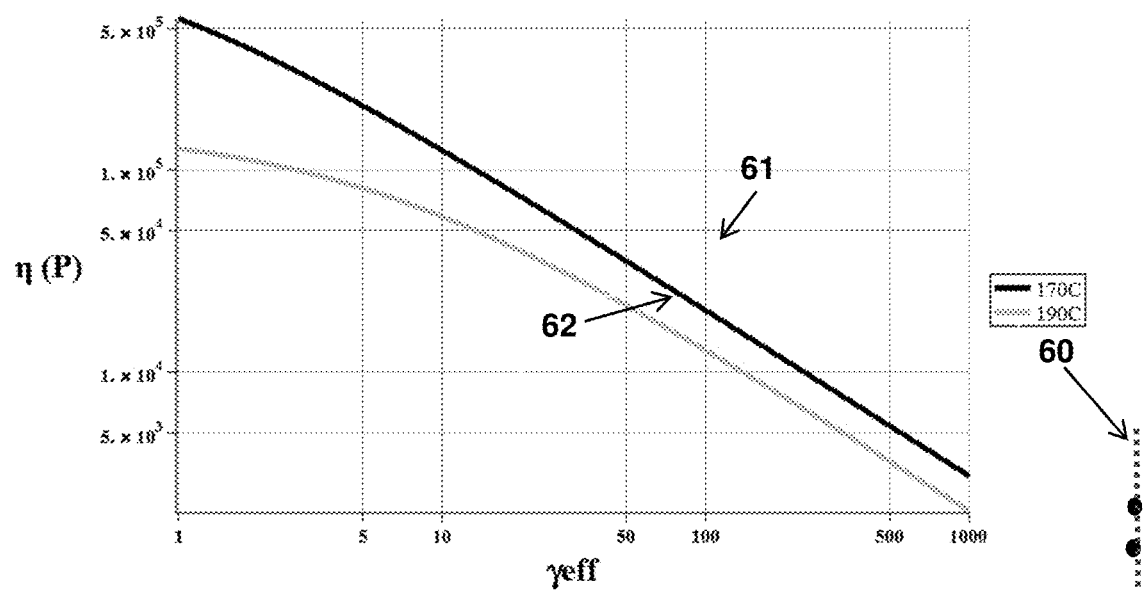
FIG. 5 is a graph of the viscosity curves for a cellulose acetate at 170° C. and 190° C.

FIG. 5 illustrates the viscosity vs. shear rate for a cellulose acetate with 30 wt % triacetin plasticizer and a number average molecular weight ("Mn") of 50000 g/mole. Plots are shown at 170° C. and 190° C. to illustrate temperature effects (denoted by 61 and 62 respectively). The dotted line 60 refers to a shear rate of 628 s$^{-1}$ as typical of our roll mill at 20 RPM as calculated above. From this, the viscosity is determined to be 4430 and 2830 Poise at 170° C. and 190° C. respectively. Using the equations above, the effective shear stress at the wall is determined to be 0.27 MPa and 0.18 MPa for cold and hot temperatures. At a processing temperature of 170° C., this shear stress is above the threshold for melt fracture of 0.2 MPa that we've observed, so melt fracture is expected, and in fact, observed. At a processing temperature of 190° C., we find that we are below the threshold of 0.2 MPa but still in the range so some slight melt fracture is expected (and observed), although it is typically very small and low enough that polishing by subsequent nips in the calender stack will remove it.

A calendered film having a shear stress under the defined processing conditions above that is below the shear stress for melt fracture and can be effectively defined by the condition $$\eta \leq 2*10^6 \frac{h}{Vf}$$

where η is the viscosity at the processing temperature and effective shear rate in the nip. In one embodiment, the conditions to ensure low melt fracture is $$\eta \leq 1.5*10^6 \frac{h}{Vf}$$

The above condition can be met by the choice of the cellulose ester type and molecular weight. Similarly, the viscosity can be further modified by choice and level of plasticizer. As shown in the Examples, a typical value of the gap h is 0.025 cm with a $V_f$ of about 15 cm/s resulting in the viscosity needing to be below about 3300 Poise, preferably below about 2500 Poise.

The present application discloses a process for preparing a film or a sheet comprising steps of: (1) selecting a composition comprising (a) a cellulose ester component of the composition wherein the cellulose ester comprises: (i) a plurality of (C$_{2-5}$)alkanoyl substituents; and (ii) a plurality of hydroxyl substituents, wherein the degree of substitution of the hydroxyl substituent ("DS$_{OH}$") is in the range of from about 0.3 to about 1.0; (b) a plasticizer; (c) a roll release agent; and (d) a processing aid, wherein the plasticizer is present in the composition in the range of from about 0 wt % to about 40.0 wt % based on the total weight of the composition, wherein the roll release agent is present in the composition in the range of from about 0.1 wt % to about 2.0 wt %, wherein the processing aid is present in the composition in the range of from about 0 wt % to about 6.0 wt % based on the total weight of the composition, wherein the cellulose ester has a glass transition temperature from about 80° C. to about 200° C., wherein the percent crystallinity of the cellulose ester obtained from the second heat cycle is less than about 20.0%, wherein the percent crystallinity from the second heat cycle is obtained by adapting ASTM D3418 assuming an enthalpy of melting of 14 cal/g for the cellulose esters; (2) calendering the composition by introducing the composition in pellet, powder, flake or melt form between at least a first calendering roll and a second calendering roll that are adjacent and heated thereby to form the film or sheet, wherein the surface temperature of the first calendering roll is within the range of from the sum of the glass transition temperature of the cellulose ester minus 20° C. to the sum of the glass transition temperature of the cellulose ester plus 50° C., wherein the first calendering roll and the second calendering roll has a gap, h, in the range of from about 0.01 cm to about 0.1 cm, wherein roll velocity, of the first calendering roll, $V_f$, is in the range of from about 1 cm/sec to about 100 cm/sec.

In one embodiment of the process, the h is from about 0.01 cm to about 0.05 cm. In one embodiment of the process, the h is from about 0.05 cm to about 0.1 cm. In one embodiment of the process, the h is from about 0.03 cm to about 0.08 cm.

In one embodiment of the process, the $V_f$ is in the range of from about 1 cm/sec to about 50 cm/sec. In one embodiment of the process, the $V_f$ is in the range of from about 50 cm/sec to about 100 cm/sec. In one embodiment of the process, the $V_f$ is in the range of from about 25 cm/sec to about 75 cm/sec.

In one embodiment of the process, the processing aid is present in the composition in the range of from about 1.0 wt % to about 3.0 wt % based on the total weight of the composition. In one embodiment of the composition, the processing aid is present in the composition in the range of from about 0 wt % to about 3 wt % based on the total weight of the composition. In one embodiment of the composition, the processing aid is present in the composition in the range of from about 0.5 wt % to about 6.0 wt % based on the total weight of the composition. In one embodiment of the composition, the processing aid is present in the composition in the range of from about 0.5 wt to about 3 wt % based on the total weight of the composition.

In one embodiment of the process, the processing aid comprises an acrylic polymer, an acrylic copolymer, a styrenic polymer, a carbonate polymer, a polyester polymer, an olefin polymer, or a siloxane polymer. In one embodiment of the composition, the processing aid comprises an acrylic polymer or an acrylic copolymer. In one embodiment, the processing aid comprises a Kane-Ace® acrylic processing aid. In one class of this embodiment, the processing aid is Paraloid™ K-125, Kane-Ace® PA-20, Kane-Ace® PA-610, Kane-Ace® B622, Kane-Ace® MR01, Kane-Ace® MP90, epoxidized soybean oil, or Eastman™ Ecdel.

In one embodiment of the process, the surface temperature of the first calendering roll is within the range of from the sum of the glass transition temperature of the cellulose ester minus 20° C. to about the sum of the glass transition temperature of the cellulose ester plus 20° C. In one embodiment of the process, the surface temperature of the first calendering roll is within the range of from the glass transition temperature of the cellulose ester to about the sum of the glass transition temperature of the cellulose ester plus 20° C.

In one embodiment of the process, the degree of substitution of the hydroxyl substituent ("DS$_{OH}$") is in the range of about 0.4 to about 0.9.

In one class of this embodiment, the percent crystallinity of the cellulose ester obtained from the second heat cycle is less than about 15.0% as measured according to ASTM D3418 assuming an enthalpy of melting of 14 cal/g for the cellulose esters.

In one class of this embodiment, the percent crystallinity of the cellulose ester obtained from the second heat cycle is less than about 10.0% as measured according to ASTM D3418 assuming an enthalpy of melting of 14 cal/g for the cellulose esters.

In one class of this embodiment, the percent crystallinity of the cellulose ester obtained from the second heat cycle is less than about 5.0% as measured according to ASTM D3418 assuming an enthalpy of melting of 14 cal/g for the cellulose esters.

In one embodiment of the process, the $DS_{OH}$ is in the range of about 0.4 to about 0.7.

In one class of this embodiment, the percent crystallinity of the cellulose ester obtained from the second heat cycle is less than about 15.0% as measured according to ASTM D3418 assuming an enthalpy of melting of 14 cal/g for the cellulose esters.

In one class of this embodiment, the percent crystallinity of the cellulose ester obtained from the second heat cycle is less than about 10.0% as measured according to ASTM D3418 assuming an enthalpy of melting of 14 cal/g for the cellulose esters.

In one class of this embodiment, the percent crystallinity of the cellulose ester obtained from the second heat cycle is less than about 5.0% as measured according to ASTM D3418 assuming an enthalpy of melting of 14 cal/g for the cellulose esters.

In one embodiment of the process, the plasticizer is in the range of from about 10.0 wt % to about 35.0 wt % based on the total weight of the composition.

In one class of this embodiment, the plasticizer is chosen from a phthalate, a fatty acid ester, a polyalcohol ether, a polyalcohol ester, a benzoate, an azelate, a citrate, a phosphate, or a trimellitate.

In one class of this embodiment, the roll release agent is present in the composition the range of from about 0.1 wt % to about 2.0 wt % based on the total weight of the composition.

In one subclass of this class, the plasticizer is chosen from a phthalate, a fatty acid ester, a polyalcohol ether, a polyalcohol ester, a benzoate, an azelate, a citrate, a phosphate, or a trimellitate.

In one sub-subclass of this subclass, the roll release agent is an ester of a fatty acid. In one sub-subclass of this subclass, the roll release agent is an ester of montanic acid.

In one class of this embodiment, the roll release agent is present in the composition the range of from about 0 wt % to about 1.0 wt % based on the total weight of the composition.

In one subclass of this class, the plasticizer is chosen from a phthalate, a fatty acid ester, a polyalcohol ether, a polyalcohol ester, a benzoate, an azelate, a citrate, a phosphate, or a trimellitate.

In one sub-subclass of this subclass, the roll release agent is an ester of a fatty acid. In one sub-subclass of this subclass, the roll release agent is an ester of montanic acid.

In one class of this embodiment, the roll release agent is present in the composition the range of from about 0.1 wt % to about 1.0 wt % based on the total weight of the composition.

In one subclass of this class, the plasticizer is chosen from a phthalate, a fatty acid ester, a polyalcohol ether, a polyalcohol ester, a benzoate, an azelate, a citrate, a phosphate, or a trimellitate.

In one sub-subclass of this subclass, the roll release agent is an ester of a fatty acid. In one sub-subclass of this subclass, the roll release agent is an ester of montanic acid.

In one embodiment of the process, the plasticizer is in the range of from about 15.0 wt % to about 30.0 wt % based on the total weight of the composition.

In one class of this embodiment, the plasticizer is chosen from a phthalate, a fatty acid ester, a polyalcohol ether, a polyalcohol ester, a benzoate, an azelate, a citrate, a phosphate, or a trimellitate.

In one class of this embodiment, the roll release agent is present in the composition the range of from about 0.1 wt % to about 2.0 wt % based on the total weight of the composition.

In one subclass of this class, the plasticizer is chosen from a phthalate, a fatty acid ester, a polyalcohol ether, a polyalcohol ester, a benzoate, an azelate, a citrate, a phosphate, or a trimellitate.

In one sub-subclass of this subclass, the roll release agent is an ester of a fatty acid. In one sub-subclass of this subclass, the roll release agent is an ester of montanic acid.

In one class of this embodiment, the roll release agent is present in the composition the range of from about 0 wt % to about 1.0 wt % based on the total weight of the composition.

In one subclass of this class, the plasticizer is chosen from a phthalate, a fatty acid ester, a polyalcohol ether, a polyalcohol ester, a benzoate, an azelate, a citrate, a phosphate, or a trimellitate.

In one sub-subclass of this subclass, the roll release agent is an ester of a fatty acid. In one sub-subclass of this subclass, the roll release agent is an ester of montanic acid.

In one class of this embodiment, the roll release agent is present in the composition the range of from about 0.1 wt % to about 1.0 wt % based on the total weight of the composition.

In one subclass of this class, the plasticizer is chosen from a phthalate, a fatty acid ester, a polyalcohol ether, a polyalcohol ester, a benzoate, an azelate, a citrate, a phosphate, or a trimellitate.

In one sub-subclass of this subclass, the roll release agent is an ester of a fatty acid. In one sub-subclass of this subclass, the roll release agent is an ester of montanic acid.

In one embodiment of the process, the roll release agent is present in the composition in the range of from about 0.1 wt % to about 2.0 wt % based on the total weight of the composition. In one class of this embodiment, the roll release agent is an ester of a fatty acid. In one class of this embodiment, the roll release agent is an ester of montanic acid.

In one embodiment of the process, the roll release agent is present in the composition in the range of from about 0 wt % to about 1.0 wt % based on the total weight of the composition. In one class of this embodiment, the roll release agent is an ester of a fatty acid. In one class of this embodiment, the roll release agent is an ester of montanic acid.

In one class of this embodiment of the process, the roll release agent is present in the composition in the range of from about 0.1 wt % to about 1.0 wt % based on the total weight of the composition. In one class of this embodiment, the roll release agent is an ester of a fatty acid. In one class of this embodiment, the roll release agent is an ester of montanic acid.

Definitions

As used herein the term "chosen from" when used with "and" or "or" have the following meanings: A variable chosen from A, B and C means that the variable can be A alone, B alone, or C alone. A variable A, B, or C means that the variable can be A alone, B alone, C alone, A and B in combination, A and C in combination, or A, B, and C in combination.

The term "alkanoyl" means a compound of the general formula—C(O)alkyl. The alkyl group can be linear or branched. If the number of carbon units is included (i.e., ($C_{2-5}$)), the carbon number includes the number of carbon units inclusive of the carbon of the carbonyl group. For example, $(C_{2-3})$alkanoyl includes acetyl and propanoyl.

The term "alkyl" means a branched or unbranched saturated hydrocarbon group, such as methyl, n-propyl, isopropyl, n-butyl, n-pentyl, isopenyl, and the like. The carbon units can be included with alkyl (i.e., $(C_{1-5})$).

The terms "a," "an," "the," and "the" mean one or more.

The terms "comprising," "comprises," and "comprise" are open-ended transition terms used to transition from a subject recited before the term to one or more elements recited after the term, where the element or elements listed after the transition term are not necessarily the only elements that make up the subject.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The terms "containing," "contains," and "contain" have the same open-ended meaning as "comprising," "comprises," and "comprise" provided above.

The terms, "including," "include," and "included" have the same open-ended meaning as "comprising," "comprises," and "comprise" provided above.

A weight percent (wt. %) of a component, unless specifically stated to the contrary, is based on the total weight of the formulation or composition in which the component is included.

The term "degree of substitution" or "DS" is the average number of a particular substituent (i.e., alkanoyl or hydroxyl) per anhydroglucose in the cellulose ester polymer. Whenever appropriate, a substrate indicating the specific substituent is included (i.e., $DS_{OH}$ or $DS_{Ac}$).

"Number Average Molecular Weight" also referred to number average molar mass ("$M_n$") is the ordinary arithmetic mean or average of the molecular masses of the individual marcomolecules (i.e., cellulose ester). Mn can be determined by methods such as gel permeation chromatography, viscometry, and vapor pressure osmometry.

"Front Roll" or "First Roll" is the calendering roll to which the film adheres after passing through the first nip. This roll is typically run slightly hotter and/or faster than the "Back Roll".

"Back Roll" or "Second Roll" is the roll adjacent to the front roll which helps guide material into the first nip. The back roll is often run cooler and/or slower than the front roll to prevent films and sheets from sticking.

"Back Roll Temperature" is the temperature of the back roll of the calendering apparatus. In one embodiment, the back roll temperature is about the temperature of the front roll. In one embodiment, the back roll temperature is at least about 5° C. cooler than the front roll. In one embodiment, the back roll temperature is about 5° C. cooler than the front roll.

"Front Roll Temperature" is the temperature of the front roll of the calendering apparatus. The temperature of the front roll is the processing temperature.

Abbreviations

CA is cellulose acetate; CAB is cellulose acetate butyrate; CAP is cellulose acetate propionate; CE is cellulose ester; % Cryst is percent crystallization; $M_n$ is number average molecular weight; $T_g$ is glass transition temperature; $DS_{Ac}$ is the degree of substitution for acetyl; $DS_{Bu}$ is the degree of substitution for butyryl; $DS_{Pr}$ is the degree of substitution for propionyl; PA is processing aid; Pz is plasticizer; $T_{FRoll}$ is front roll temperature; $T_{BRoll}$ is back roll temperature; $V_f$ is front roll velocity.

Experimental

The invention can be further illustrated by the following examples, although it will be understood that these examples of specific embodiments are included merely for purposes of illustration and are not intended to limit the scope of the invention unless otherwise specifically indicated.

The following experimental methods were used to characterize the films of the present invention.

Simulation of calendering was performed on an instrumented 2-roll mill (Dr. Collin Gmbh of Ebersberg, Germany) capable of monitoring temperatures, roll torques, and nip pressures. The rolls had a radius R of 7.5 cm. Although a variety of conditions were used, it was found that a nip gap of 0.025 cm, a front roll speed of 20 RPM and a roll friction of −20% (i.e. rear roll being 20% slower than front roll) were the most representative of a commercial calendering line. Unless otherwise stated, the run temperature refers to the temperature of the front roll upon which the material adhered; the back roll is normally 5° C. less than the run temperature.

Samples, in the form of dry-blended powders or pre-compounded pellets, were added to the roll mill and allowed to melt and mix for about 3 to 5 minutes. "Dry blending" can be accomplished in many ways, but as used in the experimental section "dry blending" is accomplished by mixing the powder and plasticizers in a plastic bag and hand tumbling the bag for about 1 minute to disperse the ingredients. At the point when full melting appeared to be reached, the mill was run for an additional 2 min at 20 RPM to ensure thorough mixing before taking readings and gauging quality.

Melt fracture was ascertained at 20 RPM using a visual scale from 1 (no visible melt fracture to 5 (severely melt fractured). Values of 1 and 2 were deemed acceptable for most commercial calendering operations since additional downstream nips would polish this low level of roughness out. A value of 3 would be acceptable in many instances with downsteam nips having higher pressure.

Roll sticking was measured using a method analogous to that described in U.S. Pat. No. 6,068,910. Front roll velocity was first dropped to 10 RPM to facilitate handling, and the material then peeled off and unwound from the roll with minimal tension. Sticking of the film would tend to cause it to "ride up" on the roll depending on how tacky it was. If the film removed easily with less than 30 degrees or so of continued winding on the roll, then it was rated a "1". A film that continued to stick/wind up to 60 degrees was deemed a "2" and up to 90 degrees was a "3". Film that continued to wrap more than 90 degrees, or simply could not be removed was ranked a "4". For production purposes, either a 1 or 2 would be considered acceptable for most applications.

Viscosity of the materials was measured at different temperatures using a parallel plate rheometer in oscillatory mode (using Cox-Merz approximation to convert oscillation frequency to shear rate). Scanning frequency was typically 1 to 400 rad/s. Viscosity at higher shear rates has also been measured using capillary rheometry according to ASTM D3835.

The % crystallizations were obtained according to ASTM D3418 assuming an enthalpy of melting of 14 cal/g for the cellulose esters.

The cellulose esters used in the experiments are compiled in Table 1. Note that these values are for the unplasticized base resins. The addition of plasticizers to the CA samples (CA1 through CA3) increased $2^{nd}$ heat crystallinity by about 5 to 10% depending on the type and level of plasticizer. Plasticizers had negligible effect on crystallinity for the CAP and CAB samples.

TABLE 1

| CE ID | CE | $DS_{OH}$ | $T_g$ (° C.) | $M_n$ (Da) | $1^{st}$ % Cryst | $2^{nd}$ % Cryst |
|---|---|---|---|---|---|---|
| CA1 | Eastman ® CA-398-30 | 0.58 | 189 | 50,000 | 20 | 1.4 |
| CA2 | Eastman ® CA-398-6 | 0.55 | 182 | 35,000 | 23 | 1.7 |
| CA3 | Eastman ® CA-398-3 | 0.55 | 180 | 30,000 | 25 | 2.3 |
| CTA1 | Eastman ® CA-436-40 | 0.15 | 204 | 70,000 | 47 | 25 |
| CAP1 | Eastman ® CAP-482-20 | 0.32 | 147 | 75,000 | 26 | 0 |
| CAP2 | Eastman ® CAP-482-0.5 | 0.42 | 142 | 25,000 | 25 | 0 |
| CAB1 | Eastman ® CAB-381-20 | 0.31 | 141 | 70,000 | 29 | 0 |
| CAB2 | Eastman ® CAB-500-5 | 0.13 | 96 | 57,000 | 33 | 0 |

General Procedure for Preparation of Compositions

The cellulose ester, Eastman® triacetin, Paraloid™ K-125, and Licolub® WE 40 were dry blended to the desired proportions for each component.

COMPARATIVE EXAMPLE 1

A dry powder blend was prepared from CTA1 (67.5 wt %), Eastman™ Triacetin (30 wt %), Paraloid™ K-125 (2 wt %) and Licolub® WE 40 (0.5 wt %) based on the total weight of the dry powder blend.

COMPARATIVE EXAMPLE 2

A dry powder blend of Eastman® CA-398-30 (67.5 wt %), Eastman™ Triacetin (30 wt %), Paraloid™ K-125 (2 wt %) and Licolub® WE 40 (0.5 wt %) was first prepared. Then a 90:10 dry powder, Eastman® CA-389-30 dry blend: Eastman® CA-436-40 dry blend was prepared.

Calendering Results of Comparative Example 1

The CEx 1 was roll-milled with a $T_{FRoll}$ of 190° C. and a $T_{BRoll}$ of 185° C. The sample would not melt and milling could not be completed. Attempts to increase $T_{FRoll}$ failed because the $T_g$ of CEx 1 was higher than the degradation temperature.

Calendering Results of Comparative Example 2

A film was produced, but it was unacceptably grainy and could not be pulled off in coherent form, as the triacetate powder portion did not melt.

Melt Fracture

By adapting the procedure for the preparation of CEx 1, the following cellulose ester compositions in Table 2 were prepared to study melt fracture.

TABLE 2

| Ex | CE | wt % CE | Pz | wt % Pz | PA | wt % PA | Wax | wt % Wax |
|---|---|---|---|---|---|---|---|---|
| 3 | CA1 | 67.5 | Eastman ™ Triacetin | 30 | Paraloid ™ K-125 | 2 | Licolub ® WE 40 | 0.5 |
| 4 | CA2 | 67.5 | Eastman ™ Triacetin | 30 | Paraloid ™ K-125 | 2 | Licolub ® WE 40 | 0.5 |
| 5 | CA3 | 67.5 | Eastman ™ Triacetin | 30 | Paraloid ™ K-125 | 2 | Licolub ® WE 40 | 0.5 |
| 6 | CA3 | 72.5 | Eastman ™ Triacetin | 25 | Paraloid ™ K-125 | 2 | Licolub ® WE 40 | 0.5 |
| 7 | CA3 | 77.5 | Eastman ™ Triacetin | 20 | Paraloid ™ K-125 | 2 | Licolub ® WE 40 | 0.5 |
| 8 | CA3 | 70.5 | Eastman ™ Triacetin | 27 | Paraloid ™ K-125 | 2 | Licolub ® WE 40 | 0.5 |

Table 3 provides melt fracture results for Examples 3-8 run at various roll temperatures. Roll radius (R)=7.5 cm, the gap (h)=0.025 cm, front roll velocity ($V_f$)=2πR*RPM/60=15.7 cm/s, shear rate=628 s$^{-1}$. The effective shear stress at the wall can be calculated and is provided in Table 3. Samples with a shear stress greater than about 0.2 MPa exhibited excessive melt fracture as denoted by a rating of 3 or greater.

TABLE 3

| Ex. | $T_{FRoll}$ (° C.) | $T_{BRoll}$ (° C.) | Melt Fracture Rating | Viscosity (Poise) | Shear Stress (MPa) |
|---|---|---|---|---|---|
| 3 | 190 | 185 | 1 | 2990 | 0.19 |
| 4 | 190 | 185 | 1 | 2350 | 0.15 |
| 5 | 190 | 185 | 1 | 2088 | 0.13 |
| 6 | 190 | 185 | 1 | 2710 | 0.15 |
| 7 | 190 | 185 | 3 | 3580 | 0.22 |
| 5 | 180 | 175 | 1 | 2640 | 0.17 |
| 4 | 180 | 175 | 3 | 2930 | 0.18 |
| 3 | 180 | 175 | 5 | 3650 | 0.23 |
| 6 | 180 | 175 | 4 | 3320 | 0.21 |
| 8 | 180 | 175 | 4 | 3010 | 0.19 |

Release Agents

By adapting the procedure for the preparation of Example 1, the following cellulose ester compositions in Table 4 were prepared to determine the effect of release agents.

TABLE 4

| Ex | CE | wt % CE | Pz | wt % Pz | PA | wt % PA | Wax | wt % Wax |
|---|---|---|---|---|---|---|---|---|
| 9 | CAP1 | 68 | Eastman ™ TEG-EH | 23 | Kane-Ace ® PA-20 | 2 | — | — |
| 10 | CAP1 | 74.5 | Eastman ™ TEG-EH | 23 | Kane-Ace ® PA-20 | 2 | Licowax ® OP/Licowax ® S | 0.15/0.35 |

TABLE 4-continued

| Ex | CE | wt % CE | Pz | wt % Pz | PA | wt % PA | Wax | wt % Wax |
|---|---|---|---|---|---|---|---|---|
| 11 | CAP1 | 74.5 | Eastman™ TEG-EH | 23 | Kane-Ace® PA-20 | 2 | Licolub WE4®/Licowax® S | 0.15/0.35 |
| 12 | CAP1 | 74.5 | Eastman™ TEG-EH | 23 | Kane-Ace® PA-20 | 2 | Licolub® WE40/Licowas® S | 0.15/0.35 |
| 13 | CAP1 | 74.5 | Eastman™ TEG-EH | 23 | Kane-Ace® PA-20 | 2 | Licowax® OP/Licomont® NaV101 | 0.15/0.35 |
| 14 | CAP1 | 74.5 | Eastman™ TEG-EH | 23 | Kane-Ace® PA-20 | 2 | Licowax® OP/Licowax S | 0.35/0.15 |
| 15 | CAP1 | 74.5 | Eastman™ TEG-EH | 23 | Kane-Ace® PA-20 | 2 | Licowax® OP/Stearic Acid | 0.15/0.35 |
| 16 | CAP1 | 74.5 | Eastman™ TEG-EH | 23 | Kane-Ace® PA-20 | 2 | Licowax® OP | 0.5 |
| 17 | CAP1 | 74.2 | Eastman™ TEG-EH | 23 | Kane-Ace® PA-20 | 2 | Licowax® OP | 0.75 |
| 18 | CAP1 | 74.0 | Eastman™ TEG-EH | 23 | Kane-Ace® PA-20 | 2 | Licowax® OP | 1.0 |
| 19 | CAP1 | 74.5 | Eastman™ TEG-EH | 23 | Kane-Ace® PA-20 | 2 | Licomont® NaV101 | 0.5 |
| 20 | CAP1 | 74.5 | Eastman™ TEG-EH | 23 | Kane-Ace® PA-20 | 2 | Licolub® WE40 | 0.5 |
| 21 | CAP1 | 74.2 | Eastman™ TEG-EH | 23 | Kane-Ace® PA-20 | 2 | Licolub® WE40 | 0.75 |
| 22 | CAP1 | 74.0 | Eastman™ TEG-EH | 23 | Kane-Ace® PA-20 | 2 | Licolub® WE40 | 1.0 |
| 23 | CAP1 | 74.2 | Eastman™ TEG-EH | 23 | Kane-Ace® PA-20 | 2 | Licomont® NaV101 | 0.75 |
| 24 | CAP1 | 74.2 | Eastman™ TEG-EH | 23 | Kane-Ace® PA-20 | 2 | Licowax® S | 0.75 |
| 25 | CAP1 | 74.2 | Eastman™ TEG-EH | 23 | Kane-Ace® PA-20 | 2 | Licolub® WE4 | 0.75 |
| 29 | CA1 | 68 | Eastman™ Triacetin | 30 | Kane-Ace® PA-20 | 2 | — | — |
| 27 | CA1 | 67.5 | Eastman™ Triacetin | 30 | Kane-Ace® PA-20 | 2 | Licowax® OP | 0.5 |
| 28 | CA1 | 67.2 | Eastman™ Triacetin | 30 | Kane-Ace® PA-20 | 2 | Licowax® OP | 0.75 |
| 29 | CA1 | 67.2 | Eastman™ Triacetin | 30 | Kane-Ace® PA-20 | 2 | Licomont® NaV101 | 0.75 |
| 30 | CA1 | 67.2 | Eastman™ Triacetin | 30 | Kane-Ace® PA-20 | 2 | Licolub® WE4 | 0.75 |
| 31 | CA1 | 67.5 | Eastman™ Triacetin | 30 | Kane-Ace® PA-20 | 2 | Licolub® WE4 | 0.5 |
| 32 | CA1 | 67.8 | Eastman™ Triacetin | 30 | Kane-Ace® PA-20 | 2 | Licolub® WE4 | 0.25 |
| 33 | CA1 | 67.9 | Eastman™ Triacetin | 30 | Kane-Ace® PA-20 | 2 | Licolub® WE4 | 0.1 |
| 34 | CA1 | 67.8 | Eastman™ Triacetin | 30 | Kane-Ace® PA-20 | 2 | Licowax® OP | 0.25 |
| 35 | CA1 | 67.5 | Eastman™ Triacetin | 30 | Kane-Ace® PA-20 | 2 | Licolub® WE40 | 0.5 |
| 36 | CA1 | 67.8 | Eastman™ Triacetin | 30 | Kane-Ace® PA-20 | 2 | Licolub® WE40 | 0.25 |

These examples illustrate the effect of various waxes on the release characteristics of the film, and how behavior is very different than other calendered materials in the literature. For reference, we compare the behavior to U.S. Pat. No. 6,551,688 (Examples 1-8 and Comparative Examples 9-12) where a series of waxes are used with calendered polyesters. In U.S. Pat. No. 6,551,688, the waxes caused excessive haze at higher levels, and so efforts therein are made to mix waxes to achieve good release while keeping haze low. In the case of cellulose esters, the haze is not nearly as big a factor since the waxes are similar in refractive index to the cellulose esters and therefore scatter less light. We use a similar range of waxes and wax combinations to illustrate how much different the behavior is.

All of the samples made with CAP were run at 165° C. using 23 wt % of Eastman™ TEG-EH as a plasticizer. The CA samples contained 30% Eastman™ Triacetin plasticizer and were processed at 190° C. A temperature was chosen for each to give a good balance of low melt fracture and borderline adhesion in order to test efficacy of waxes. Both samples contained 2 wt % of Kaneka Kane-Ace™ PA-20 acrylic processing aid (Kaneka Americas, Pasadena Tex.).

For the CAP samples, it is found that generally higher levels of waxes are needed to ensure good release as compared with cellulose acetate.

Haze was unquantifiable for some samples because some of the samples were not controlled for melt fracture. Therefore, haze was not quantified. However, most of the films produced from the samples exhibited good clarity, if melt fracture is excluded.

Table 5 shows the calendering results for Ex. 9-36.

TABLE 5

| Ex | CE | $T_{FRoll}$ (° C.) | $T_{BRoll}$ (° C.) | Melt Fract. | Sticking |
|---|---|---|---|---|---|
| 9 | CAP1 | 165 | 160 | 2 | 4 |
| 10 | CAP1 | 165 | 160 | 2 | 4 |
| 11 | CAP1 | 165 | 160 | 3 | 4 |

TABLE 5-continued

| Ex | CE | $T_{FRoll}$ (°C.) | $T_{BRoll}$ (°C.) | Melt Fract. | Sticking |
|---|---|---|---|---|---|
| 12 | CAP1 | 165 | 160 | 3 | 2 |
| 13 | CAP1 | 165 | 160 | 2 | 4 |
| 14 | CAP1 | 165 | 160 | 2 | 4 |
| 15 | CAP1 | 165 | 160 | 2 | 4 |
| 16 | CAP1 | 165 | 160 | 3 | 4 |
| 17 | CAP1 | 165 | 160 | 1 | 4 |
| 18 | CAP1 | 165 | 160 | 1 | 3 |
| 19 | CAP1 | 165 | 160 | 3 | 2 |
| 20 | CAP1 | 165 | 160 | 3 | 4 |
| 21 | CAP1 | 165 | 160 | 2 | 4 |
| 22 | CAP1 | 165 | 160 | 2 | 2 |
| 23 | CAP1 | 165 | 160 | 4 | 2 |
| 24 | CAP1 | 165 | 160 | 3 | 4 |
| 25 | CAP1 | 165 | 160 | 2 | 3 |
| 26 | CA1 | 190 | 185 | 1 | 4 |
| 27 | CA1 | 190 | 185 | 4 | 4 |
| 28 | CA1 | 190 | 185 | 2 | 1 |
| 29 | CA1 | 190 | 185 | N/A | 1 |
| 30 | CA1 | 190 | 185 | 3 | 1 |
| 31 | CA1 | 190 | 185 | 3 | 1 |
| 32 | CA1 | 190 | 185 | 3 | 1 |
| 33 | CA1 | 190 | 185 | 3 | 1 |
| 34 | CA1 | 190 | 185 | 3 | 4 |
| 35 | CA1 | 190 | 185 | 2 | 2 |
| 36 | CA1 | 190 | 185 | 1 | 2 |

Cellulose Acetate Butyrates

The following cellulose acetate butyrate compositions (Ex. 37-40) in Table 6 were prepared by adapting the previously discussed procedures.

TABLE 6

| Ex | CE | wt % CE | Pz | wt % Pz | PA | wt % PA | Wax | wt % Wax |
|---|---|---|---|---|---|---|---|---|
| 37 | CAB2 | | Eastman™ Triacetin | 10 | Paraloid™ K-125 | 2 | Licowax® OP | 1.25 |
| 38 | CAB1 | | Eastman™ DOA | 16 | — | — | — | — |
| 39 | CAB1 | | Eastman™ DOA | 22 | — | — | — | — |
| 40 | CAB1 | | Eastman™ DOA | 16 | — | — | Licolub® WE40 | 1 |

Table 7 shows the calendering results for Ex. 37-40.

TABLE 7

| Ex. | $T_{FRoll}$ (°C.) | $T_{BRoll}$ (°C.) | Melt Fracture | Sticking Factor |
|---|---|---|---|---|
| 37 | 125 | 120 | 4 | 2 |
| 38 | 160 | 155 | 3 | 4 |
| 38 | 155 | 150 | 5 | 3 |
| 39 | 160 | 155 | 1 | 4 |
| 40 | 160 | 155 | 2 | 2 |

Miscellaneous Processing Aids and Modifiers

The cellulose ester compositions with various processing aids were prepared; the compositions are shown in Table 8.

TABLE 8

| Ex | CE | wt % CE | Pz | wt % Pz | PA | wt % PA |
|---|---|---|---|---|---|---|
| 41 | CA1 | 75 | Eastman™ Triacetin | 25 | — | — |
| 42 | CA1 | 73 | Eastman™ Triacetin | 25 | Kane-Ace® PA-20 | 2 |
| 43 | CA1 | 71 | Eastman™ Triacetin | 25 | Kane-Ace® PA-20 | 4 |
| 44 | CA1 | 69 | Eastman™ Triacetin | 25 | Kane-Ace® PA-20 | 6 |
| 45 | CA1 | 73 | Eastman™ Triacetin | 25 | Kane-Ace® PA-610 | 2 |
| 46 | CA1 | 73 | Eastman™ Triacetin | 25 | Kane-Ace® B622 | 2 |
| 47 | CA1 | 70 | Eastman™ Triacetin | 25 | Kane-Ace® MR01 | 5 |
| 48 | CA1 | 73 | Eastman™ Triacetin | 25 | Kane-Ace® MP90 | 2 |
| 49 | CA1 | 74 | Eastman™ Triacetin | 25 | Epoxidized Soybean Oil | 1 |
| 50 | CA1 | 73 | Eastman™ Triacetin | 25 | Eastman™ Ecdel | 2 |
| 51 | CA1 | 68 | Eastman™ Triacetin | 25 | Eastman™ Ecdel/Kane-Ace® PA-20 | 5/2 |

Table 9 shows the calendering results for Ex. 41-51.

TABLE 9

| Ex | $T_{Froll}$ (°C.) | $T_{Broll}$ (°C.) | $V_f$ (RPM) | Melt Fracture Rating |
|---|---|---|---|---|
| 41 | 190 | 185 | 20 | 5 |
| 41 | 195 | 190 | 20 | 3 |
| 42 | 190 | 185 | 20 | 3 |
| 43 | 190 | 185 | 20 | 2 |
| 44 | 190 | 185 | 20 | 3 |
| 45 | 190 | 185 | 20 | 4 |
| 46 | 190 | 185 | 20 | 4 |
| 47 | 190 | 185 | 20 | 1 |
| 48 | 190 | 185 | 20 | 4 |
| 49 | 190 | 185 | 20 | 4 |
| 50 | 190 | 185 | 20 | 3 |
| 51 | 190 | 185 | 20 | 2 |

Unplasticized Samples

Additional cellulose esters were run containing no plasticizer and are described in Table 10 and 11. The unplasticized samples had to be run hotter than their plasticized counterparts, but otherwise made good quality films.

TABLE 10

| Ex | CE | wt % CE | Pz | wt % Pz | PA | wt % PA | Wax | wt % Wax |
|---|---|---|---|---|---|---|---|---|
| 61 | CAP1 | 97 | none | 0 | Paraloid ™ K-125 | 2 | Licowax ® OP | 1 |
| 62 | CAB1 | 97 | none | 0 | Paraloid ™ K-125 | 2 | Licowax ® OP | 1 |

TABLE 11

| Ex. | $T_{FRoll}$ (° C.) | $T_{BRoll}$ (° C.) | Melt Fracture | Sticking Factor |
|---|---|---|---|---|
| 61 | 205 | 200 | 2 | 2 |
| 62 | 195 | 190 | 2 | 2 |

We claim:

1. A composition for calendering comprising
    (a) a cellulose ester comprising
        (i) a plurality of ($C_{2-5}$)alkanoyl substituents; and
        (ii) a plurality of hydroxyl substituents,
            wherein the degree of substitution of the hydroxyl substituent ("$DS_{OH}$") is in the range of from 0.3 to 1.0;
    (b) a plasticizer;
    (c) a roll release agent; and
    (d) a processing aid,
    wherein the plasticizer is present in the composition in the range of from 15.0 wt % to 30.0 wt % based on the total weight of the composition,
    wherein the roll release agent is present in the composition in the range of from 0.1 wt % to 2.0 wt % based on the total weight of the composition,
    wherein the processing aid is present in the composition in the range of from 0.5 wt % to 6.0 wt % based on the total weight of the composition,
    wherein the cellulose ester has a glass transition temperature from 80° C. to 200° C.,
    wherein the percent crystallinity of the cellulose ester obtained from a second heat cycle is less than 20.0 wt %, wherein the percent crystallinity from the second heat cycle is obtained according to ASTM D3418 assuming an enthalpy of melting of 14 cal/g for the cellulose esters, and
    wherein the composition has a melt viscosity according to ASTM 3835 in the range of from 1000 Poise to 5000 Poise at a temperature of 190° C. and a shear rate of 628 $s^{-1}$.

2. The composition of claim 1, wherein the composition is capable of being calendered at the temperature range of the sum of the glass transition temperature of the cellulose ester minus 20° C. to the sum of the glass transition temperature of the cellulose ester plus 50° C.

3. The composition of claim 1, wherein the cellulose ester is a cellulose acetate, a cellulose propionate, a cellulose butyrate, a cellulose acetate propionate, or a cellulose acetate butyrate.

4. The composition of claim 1, wherein the cellulose ester is a cellulose propionate, a cellulose butyrate, a cellulose acetate propionate, or a cellulose acetate butyrate.

5. The composition of claim 1, wherein the optional processing aid comprises an acrylic polymer or an acrylic copolymer.

6. A calendered article which is a film or a sheet comprising the composition of claim 1.

* * * * *